United States Patent [19]

Gamer

[11] 4,430,129
[45] Feb. 7, 1984

[54] METHOD OF CLEANING HOLLOW CONDUCTORS OF COOLED ELECTRICAL MACHINES

[75] Inventor: Gerold Gamer, Mannheim, Fed. Rep. of Germany

[73] Assignee: Brown, Boveri & Cie Aktiengesellschaft, Mannheim-Käfertal, Fed. Rep. of Germany

[21] Appl. No.: 413,771

[22] Filed: Sep. 1, 1982

[30] Foreign Application Priority Data

Sep. 2, 1981 [DE] Fed. Rep. of Germany ....... 3134803

[51] Int. Cl.³ ............................ B08B 3/08; B08B 9/06
[52] U.S. Cl. ..................................... 134/22.19; 134/41
[58] Field of Search .................. 134/22.1, 22.14, 22.19, 134/41; 252/95, 100, 102, DIG. 11

[56] References Cited

U.S. PATENT DOCUMENTS 3,010,853 11/1961 Elliott .............................. 134/22.14

OTHER PUBLICATIONS

Loucks, Charles U., "Chemical Engineering", Deskbook Issue, Feb. 26, 1973, Boosting Capabilities with Chemicals, pp. 79–84.

Primary Examiner—Richard V. Fisher
Assistant Examiner—Joye Woodard
Attorney, Agent, or Firm—Herbert L. Lerner; Laurence A. Greenberg

[57] ABSTRACT

For the chemical cleaning of cooled waveguides, in particular water-cooled waveguides of electric machines and apparatus, whose cooling cycle is maintained by a feed pump and comprises an ion exchanger in a closable bypass, alternately a complexing agent is added into the cooling cycle with the bypass closed and thereafter a purification of the cooling water via the ion exchanger is effected with the bypass open. The preferred complexing agent is a chelate former or one of the salts thereof. In addition to the complexing agent, an oxidant, in particular hydrogen peroxide or oxygen gas, may be added in at least one passage cycle.

11 Claims, 1 Drawing Figure

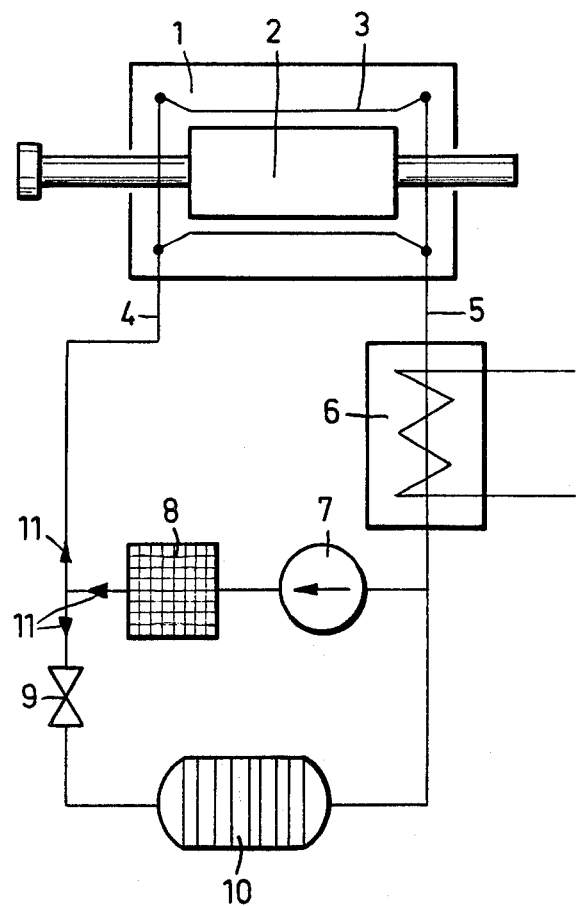

METHOD OF CLEANING HOLLOW CONDUCTORS OF COOLED ELECTRICAL MACHINES

BACKGROUND OF THE INVENTION

1. Field of the Invention

The invention relates to a method for the chemical cleaning of cooled waveguides, in particular water-cooled waveguides of electric machines and apparatus, whose cooling cycle is maintained by a feed pump and has an ion exchanger in a closable bypass. If the method is to be used for cleaning differently cooled waveguides, these devices must, as a rule, be newly designed.

2. Description of the Prior Art

Methods are known for cleaning of water-cooled waveguides wherein the closed cooling cycle is opened and connected to a cleaning means. This intervention in the installation costs time and labor and a relatively long down time since access to the installation is required for a long time.

After connection of the cleaning means, which comprises essentially a cleaning tank and a cleaning agent pump as well as a condensation replenisher, the cooling water is drained from the cooling cycle of the waveguide, and then cleaning agent is filled in and circulated. Cleaning agents used are pickling solutions which contain e.g., mineral acid (sulfuric acid, hydrochloric acid, etc.) and sometimes additionally oxidants (potassium bichromate, ammonium peroxydisulfate, etc.).

After the pickling solution has become inactive, it is drained. If desired, additional pickling cycles follow. To protect the surface of the waveguides (roughening) and in order not to diminish the wall thickness of the waveguides too much, the pickling time must be kept as short as possible, so that often a compromise must be found between the cleaning result and the attack on the waveguide surface.

Another problem arising from this method is the disposal of the spent pickling solution.

SUMMARY OF THE INVENTION

An object of the invention is to provide a method for the chemical cleaning of water-cooled waveguides by electrical machines and apparatus whose cooling cycle comprises an ion exchanger in a closable bypass, which can be carried out without changes in the cooling cycle and which can be stopped at any time within a relatively short time and permits purification of the cycle water via the ion exchanger, so that after a relatively short access time, the installation containing the waveguide can be put into operation again. The above-mentioned problems and disadvantages of known methods are avoided here.

With the foregoing and other objects in view, there is provided in accordance with the invention a method for chemical cleaning of water-cooled waveguides of electric machines whose interiors have become corroded which comprises circulating cooling water through waveguides of an electric machine, cooling the water after discharge from the waveguides, and returning the cooled water to the waveguides by a pump which maintains the cooling cycle of the circulating water, and a closable bypass with an interposed ion exchanger connected to the cooling cycle, the combination therewith of closing the bypass and adding a complexing agent into the cooling cycle with the bypass closed to effect removal of at least some of the corrosion products in the waveguides into the circulating water, thereafter opening the bypass to cause the water containing impurities after cleaning the waveguides to flow in contact with the ion exchanger to effect purification of the water, and repeating said operations of closing the bypass and adding a complexing agent, and thereafter opening the bypass to purify the water by contact with the ion exchanger, until sufficient cleaning of the waveguides is effected.

Other features which are considered as characteristic for the invention are set forth in the appended claims.

Although the invention is illustrated and described herein as embodied in a method of cleaning hollow conductors of cooled electrical machines and apparatus, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a system for a method for chemical cleaning water-cooled waveguides of electric machines in accordance with the invention. Circulation of cooling water is maintained by a pump which forces the water through a filter, thence through the stator windings of copper waveguides of a water cooled electric machine. The water discharged from the electric machine is cooled in a heat exchanger and the cooled water recirculated by the pump. A bypass cleaning cycle connected at the inlet side of the pump and the outlet side of the filter has an ion exchanger and shut-off valve connected in series. A complexing agent is added into the cooling cycle with the valve closed and thereafter purification of the cooling water via the ion exchanger is effected with the bypass open.

DETAILED DESCRIPTION OF THE INVENTION

In accordance with the invention, cleaning of the waveguides is characterized in that alternately a complexing agent is added into the cooling cycle with the bypass closed and thereafter a purification of the cooling water is effected via the ion exchanger with the bypass open.

Addition of the complexing (sequestering) agent, which serves to dissolve copper corrosion products contained in the cycle, can be accomplished by opening the cooling cycle at a suitable point of low pressure and introducing the complexing agent at that point, or connecting a pressure pump (metering pump) to the cycle and thereby injecting the agent into the cycle. The quantity of agent added, and hence the concentration of the solution containing the agent, depends to a large extent on the quantity of the corrosion products to be dissolved, on the cycle volume, and on the condition of the surface with regard to the effects of corrosion of the waveguide system and of the cooling cycle.

The complexing agent reacts with the copper corrosion products to form copper complexes which in the cleaning phase of the method remain in the ion exchanger with the bypass open. The method can be carried out with comparatively low concentrations of chemical in comparison to pickling solutions.

Chelate formers are suitable as complex formers according to the invention. These organic complex formers are derivatives of acetic acid and form very stable metal complexes. If they are used as free acid, one can observe the reaction with copper ions directly by the decrease in conductivity. However, as free acid they are barely soluble in neutral water, so that their addition to the cycle is a problem. For this reason one preferably uses an easily soluble salt of the chelates, among which sodium salt may be preferred for reasons of cost.

Especially suitable chelate formers are ethylene diamine tetraacetic acid (EDTA in international usage), nitrilo triacetic acid (NTA in international usage), diethylene triamine pentaacetic acid (DTPA in international usage), cyclohexane diamine tetraacetic acid (CDTA in international usage), and hydroxy ethylene diamino triacetic acid (DEDTA in international usage) and their salts, e.g. the disodium salt of EDTA, the pentasodium salt of DTPA, or the trisodium salt of HEDTA.

For reasons of cost, preference can generally be given to EDTA, even if the complex formation constant for copper complexes is higher with CDTA and DTPA.

EDTA forms a complex only with bivalent copper Cu(II). However, it also reacts with Cu(I) with disproportionation, metallic copper being formed:

$$2Cu(I) + EDTA \rightleftharpoons Cu(II)(EDTA) + Cu.$$

In an advantageous manner this metallic copper is brought into solution by addition of an oxidant into the cooling cycle. The oxidant may preferentially consist of hydrogen peroxide $H_2O_2$, as it forms no residues in the reaction in aqueous solution.

For the same reason oxygen gas is also suitable as an oxidant. It can be supplied to the solution by aeration.

With reference to the schematic representation, a method for the chemical cleaning of a cooling cycle containing a waveguide system is explained as an example.

The drawing shows in greatly simplified form the cooling cycle for the winding of a water-cooled electric machine. The sketched machine 1 consists essentially of a rotor 2 and a stator whose windings 3 consist of copper waveguides and are connected via conduits 4 and 5 with a heat exchanger 6, a cooling medium pump 7, and a filter 8 to form a cooling cycle. In parallel with the cooling medium pump 7 and filter 8 there is connected as bypass a cleaning cycle, consisting of a shutoff valve 9 and ion exchanger 10. The cooling cycle is a closed cycle.

The flow direction of the cooling medium water is indicated by arrows 11. The water is a pure deionate of low conductivity, which during operation is continuously being processed in the ion exchanger to (mixed bed with anion and cation exchangers).

During prolonged operating times of the machine, copper corrosion products may form in the cooling cycle, in particular cuprite $Cu_2O$ and tenorite $CuO$. The copper corrosion products deposit on the walls of the cooling system, in particular in the area of the stator windings 3, and lead to gradual obstruction of the cross sections, so that at constant cooling medium flow the pressure drop across the stator winding increases. The cooling efficiency decreases because of inferior heat transfer values. It may also happen that due to the corrosion products some rods of the stator windings 3 clog up completely. It is necessary, therefore, to clean the cooling cycle chemically if this is indicated by a corresponding pressure increase over the machine winding.

Cleaning is effected after the machine has been stopped. To this end valve 9 is closed, and the cleaning solution is added in the main cycle and circulated. The disodium salt of EDTA forms a complex with bivalent copper Cu(II). It reacts also with univalent copper Cu(I) with disproportionation. Because of the formation of very stable complexes (complex formation constant $10^{18.8}$ according to Schwarzenback Flaschka "Die Komplexometrische Titration", 1965), an almost complete reaction with the copper ions takes place.

The metallic copper forming in the disproportionation is oxidized by the added $H_2O_2$. Due to its greater specific surface, the copper forming the disproportionation reacts faster with $H_2O_2$ than does the copper of the waveguide walls. By addition of $H_2O_2$ the lines of the cooling system are prevented from becoming copper-plated, which latter would cause insulated sections to be bridges.

In contrast to the use of EDTA as free acid, when flushing with the disodium salt of EDTA the conductivity decreases only little in the reaction of the complex former with copper ions. The reaction can therefore be observed only by the color increase or analytically, e.g. by atom absorption spectroscopy.

After the reaction (1 to 2 hours) valve 9 is opened, so that the purification of the cooling water via the ion exchanger 10 takes place. It is not necessary to change the cooling water.

The water purification is followed by additional cleaning cycles. The cleaning can be stopped at any time, so that after purification of the cooling water via the ion exchanger 10 the machine 1 can be promptly put in operation. As a low concentration of chemicals can be selected, the materials lying in the cooling cycle are attacked very little, in contrast to the pickling method of the prior art. In particular, the attack of the waveguide walls is very slight.

The foregoing is a description corresponding to German Application P 31 34 803.3, dated Sept. 2, 1981, international priority of which is being claimed for the instant application, and which is hereby made part of this application. Any discrepancies between the foregoing specification and the aforementioned corresponding German application are to be resolved in favor of the latter.

I claim:

1. Method for chemical cleaning of water-cooled waveguides of electric machines whose interiors have become corroded which comprises circulating cooling water through waveguides of an electric machine, cooling the water after discharge from the waveguides, and returning the cooled water to the waveguides by a pump which maintains the cooling cycle of the circulating water, and a closable bypass with an interposed ion exchanger connected to the cooling cycle, the combination therewith of closing the bypass and adding a complexing agent into the cooling cycle with the bypass closed to effect removal of at least some of the corrosion products in the waveguides into the circulating water, thereafter opening the bypass to cause the water containing impurities after cleaning the waveguides to flow in contact with the ion exchanger to effect purification of the water, and repeating said operations of closing the bypass and adding a complexing agent, and thereafter opening the bypass to purify the water by contact with the ion exchanger, until sufficient cleaning of the waveguides is effected.

2. Method according to claim 1, wherein the complexing agent is a chelate former.

3. Method according to claim 1, wherein the complexing agent is a salt of a chelate former.

4. Method according to claim 1, wherein the complexing agent contains ethylene diamine tetraacetic acid or one of its salts.

5. Method according to claim 1, wherein the complexing agent contains nitrilo triacetic acid or one of its salts.

6. Method according to claim 1, wherein the complexing agent contains diethylene triamine pentaacetic acid or one of its salts.

7. Method according to claim 1, wherein the complexing agent contains cyclohexane diamine tetraacetic acid or one of its salts.

8. Method according to claim 1, wherein the complexing agent contains hydroxy ethylene diamino triacetic acid or one of its salts.

9. Method according to claim 1, wherein an oxidant is added into the cooling cycle in addition to the complexing agent at least in one passage cycle.

10. Method according to claim 9, wherein the oxidant is hydrogen peroxide.

11. Method according to claim 9, wherein the oxidant is oxygen gas.

* * * * *